US010750385B2

(12) United States Patent
Drazynski et al.

(10) Patent No.: US 10,750,385 B2
(45) Date of Patent: Aug. 18, 2020

(54) METHODS AND APPARATUSES RELATING TO V2X COMMUNICATION (71) Applicant: Nokia Technologies Oy, Espoo (FI)

(72) Inventors: Karol Drazynski, Wroclaw (PL); Krzysztof Kordybach, Pulawy (PL); Maciej Januszewski, Pila (PL); Jedrzej Stanczak, Poznan (PL)

(73) Assignee: Nokia Technologies Oy, Espoo (FI)

( * ) Notice: Subject to any disclaimer, the term of this patent is extended or adjusted under 35 U.S.C. 154(b) by 267 days.

(21) Appl. No.: 15/224,938

(22) Filed: Aug. 1, 2016

(65) Prior Publication Data

US 2018/0035320 A1   Feb. 1, 2018

(51) Int. Cl.
*H04W 24/08*   (2009.01)
*H04L 29/08*   (2006.01)
*H04W 4/02*   (2018.01)
*H04W 4/029*   (2018.01)
*H04W 4/44*   (2018.01)
*H04W 24/10*   (2009.01)

(52) U.S. Cl.
CPC .......... *H04W 24/08* (2013.01); *H04W 4/029* (2018.02); *H04W 4/44* (2018.02); *H04W 24/10* (2013.01)

(58) Field of Classification Search
CPC ....... H04W 24/08; H04W 4/02; H04W 24/10; H04W 4/046; H04W 4/04; H04W 84/005; H04L 67/12; H04L 2209/84; G08G 1/161–163
See application file for complete search history.

(56) References Cited

U.S. PATENT DOCUMENTS

| 9,584,974 | B1* | 2/2017 | Omer | H04W 4/023 |
| 9,648,539 | B1* | 5/2017 | Hou | H04W 36/00835 |
| 2008/0238661 | A1* | 10/2008 | Camp | G01S 5/0252 |
| | | | | 340/539.21 |
| 2012/0040691 | A1* | 2/2012 | Han | G01S 1/042 |
| | | | | 455/456.1 |

(Continued)

FOREIGN PATENT DOCUMENTS

| WO | 2015/160859 A1 | 10/2015 |
| WO | WO-2017134986 A1 * | 8/2017 ............. G08G 1/166 |

OTHER PUBLICATIONS

J. Park, J. Kim, S. Kuk, Y. Park and H. Kim, "Exploring Smartphones as WAVE Devices," 2015 IEEE 82nd Vehicular Technology Conference (VTC2015-Fall), Boston, MA, 2015, pp. 1-5.*

(Continued)

*Primary Examiner* — Maharishi V Khirodhar
*Assistant Examiner* — Kenneth P Hunt
(74) *Attorney, Agent, or Firm* — Locke Lord LLP (57) ABSTRACT This specification describes a method comprising responding to a detection of a variation in at least one measured characteristic of a reference signal transmitted from an access point to a portable device by triggering participation by the portable device in vehicle-to-portable device communications. In some examples, the triggering of the participation in the vehicle-to-portable device communications in response to the detection of the variation in the at least one measured characteristic of the reference signal may be performed only if it has been determined that a location of the portable device satisfies a predetermined condition.

19 Claims, 5 Drawing Sheets

(56) References Cited

U.S. PATENT DOCUMENTS

| | | | |
|---|---|---|---|
| 2014/0045556 A1* | 2/2014 | Subramanian | H04W 52/0251 455/574 |
| 2015/0304817 A1* | 10/2015 | Yorifuji | H04M 1/67 455/456.1 |
| 2016/0227458 A1* | 8/2016 | Lee | H04W 36/165 |
| 2018/0017661 A1* | 1/2018 | Morioka | G01S 5/08 |
| 2018/0035255 A1* | 2/2018 | Kordybach | H04W 4/046 |
| 2018/0302768 A1* | 10/2018 | Uchiyama | G08G 1/166 |

OTHER PUBLICATIONS

MIT Haystack Observatory, "GPS Tutorial," Feb. 1, 2001, see Highlighting, https://www.haystack.mit.edu/edu/pcr/GPS/documents/gpstutorial.htm.*

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.1.0, Mar. 2016, pp. 1-551.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.3.0, Mar. 2016, pp. 1-295.

"3rd Generation Partnership Project; Technical Specification Group Radio Access Network; Study on LTE-based V2X Services; (Release 14)", 3GPP TR 36.885, V2.0.0, Jun. 2016, pp. 1-220.

"Potential Enhancements for V2P", 3GPP TSG-RAN WG2 #94, R2-164080, Agenda: 8.11.4, LG Electronics Inc, May 23-27, 2016, pp. 1-2.

"Power Consumption Aspects for V2P", 3GPP TSG-RAN WG2 #94, R2-164098, Agenda: 8.11.4, InterDigital, May 23-27, 2016, pp. 1-4.

"3rd Generation Partnership Project; Technical Specification Group Radio Access Network; Evolved Universal Terrestrial Radio Access (E-UTRA); LTE Positioning Protocol (LPP) (Release 13)", 3GPP TS 36.355, V13.1.0, Mar. 2016, pp. 1-141.

Extended European Search Report for European Patent Application No. 17836463.4 dated Jan. 21, 2020, 12 pages.

International Search Report and Written Opinion received for corresponding Patent Cooperation Treaty Application No. PCT/FI2017/050547, dated Nov. 1, 2017, 14 pages.

"Vulnerable Road User Safety Message Minimum Performance Requirements" SAE International, V6.5, 2015, pp. 1-26.

"Intelligent Transport System (ITS); Vulnerable Road Users (VRU); Study of use Cases and standardisation perspectives [Release 2]", ETSI TR 103 300, V0.0.4, Apr. 2016, pp. 1-123.

* cited by examiner

METHODS AND APPARATUSES RELATING TO V2X COMMUNICATION

FIELD

This specification relates generally to V2X communication.

BACKGROUND

One of the aims with future E-UTRA (subsequent 3GPP LTE releases) and 5G networks is to support Vehicle-to-X (V2X) communication. V2X communication is the passing of information from a vehicle to any entity that may affect the vehicle, and vice versa. This information exchange can be used for a host of safety, mobility and environmental applications to include driver assistance and vehicle safety, speed adaptation and warning, emergency response, safety, traveller information, navigation, traffic operations and demand management, personal navigation, commercial fleet planning and payment transactions. There may be significant societal benefit and commercial value to delivering safety, mobility and convenience applications that rely on V2X.

Basic entities within a V2X communication system are the vehicles (V) and their connectivity to any other Intelligent Transportation System (ITS) station. Therefore, V2X communication systems include transceivers, in the form of eNodeBs (eNBs) or user equipment (UEs) located on vehicles, mounted on the roadside infrastructure, in aftermarket devices, or within portable devices of pedestrians or other vulnerable road users. V2X communication may include, but not exclusively, Vehicle to Vehicle (V2V) communication, Vehicle to Infrastructure (V2I) communication, and Vehicle to Portable UE/device (V2P) communication.

Recent documents published by the 3GPP include provisions for the implementation of V2X. However, much of the implementation detail is still marked as "for future study".

SUMMARY

In a first aspect, this specification describes a computer-implemented method comprising responding to a detection of a variation in at least one measured characteristic of a reference signal transmitted from an access point to a portable device by triggering participation by the portable device in vehicle-to-portable device communications.

The method may further comprise determining whether a location of the portable device satisfies a predetermined condition, and triggering the participation by the portable device in the vehicle-to-portable device communications in response to the detection of the variation in the at least one measured characteristic of the reference signal only if it has been determined that the location of the portable device satisfies the predetermined condition. The predetermined condition may comprise a requirement of a predetermined relationship between the location of the portable device and a location of a component of a vehicular transportation network.

The method may further comprise, in response to the determination that the location of the portable device satisfies the predetermined condition, becoming responsive to detection of the variation in the at least one characteristic of the reference signal to trigger the participation by the portable device in the vehicle-to-portable device communications. Alternatively, the method may further comprise responding to the detection of the variation in the at least one measured characteristic by performing the determination as to whether the location of the portable device satisfies the predetermined condition.

The method may further comprise triggering the participation by the portable device in the vehicle-to-portable device communications in response to a detection of a variation in at least one measured characteristic of a predefined plural number of reference signals each transmitted to the user equipment from a different access point.

The method may further comprise triggering the participation by the portable device in the vehicle-to-portable device communications in response to a detection of variation in plural measured characteristics of the reference signal transmitted to the portable device from the access point.

The triggering may comprise an access point which is currently serving the portable device transmitting a control signal to the portable device for triggering the participation by the portable device in the vehicle-to-portable device communications. In such examples, the method may further comprise, prior to the triggering, receiving, from the portable device at the access point which is currently serving the portable device, information indicative of successive measurements of the at least one characteristic of the reference signal. The method may further comprise, in response to determining that a location of the portable device satisfies a predetermined condition, causing the portable device to commence provision to the access point which is currently serving the portable device of the information indicative of successive measurements of the at least one characteristic of the reference signal.

Alternatively, the triggering of the participation by the portable device in the vehicle-to-portable device communications may be performed by the portable device.

The method may further comprise determining a location of the portable device based at least in part on the at least one measured characteristic of at least two reference signals received from different access points.

The reference signal may usable by the portable device for channel estimation. Also or alternatively, the at least one measured characteristic of the reference signal may comprise at least one of reference signal received power and reference signal received quality.

The variation in the at least one measured characteristic of the reference signal may be indicative of movement of the portable device. Alternatively or additionally, the variation in the at least one measured characteristic of the reference signal may be a variation which satisfies at least one predetermined requirement.

In a second aspect, this specification describes apparatus configured to perform any method described with reference to the first aspect.

In a third aspect, this specification describes computer-readable instructions which, when executed by computing apparatus, causes the computing apparatus to perform any method described with reference to the first aspect.

In a fourth aspect, this specification describes apparatus comprising at least one processor, and at least one memory including computer program code which, when executed by the at least one processor, causes the apparatus to respond to a detection of a variation in at least one measured characteristic of a reference signal transmitted from an access point to a portable device by triggering participation by the portable device in vehicle-to-portable device communications.

The computer program code, when executed by the at least one processor, may cause the apparatus to determine whether a location of the portable device satisfies a predetermined condition, and to trigger the participation by the portable device in the vehicle-to-portable device communications in response to the detection of the variation in the at least one measured characteristic of the reference signal only if it has been determined that the location of the portable device satisfies the predetermined condition. The predetermined condition may comprise a requirement of a predetermined relationship between the location of the portable device and a location of a component of a vehicular transportation network. The computer program code, when executed by the at least one processor, may cause the apparatus, in response to the determination that the location of the portable device satisfies the predetermined condition, to become responsive to detection of the variation in the at least one characteristic of the reference signal to trigger the participation by the portable device in the vehicle-to-portable device communications. Alternatively, the computer program code, when executed by the at least one processor, may cause the apparatus to respond to the detection of the variation in the at least one measured characteristic by performing the determination as to whether the location of the portable device satisfies the predetermined condition The computer program code, when executed by the at least one processor, may cause the apparatus to trigger the participation by the portable device in the vehicle-to-portable device communications in response to a detection of a variation in at least one measured characteristic of a predefined plural number of reference signals each transmitted to the user equipment from a different access point. The computer program code, when executed by the at least one processor, may further cause the apparatus to trigger the participation by the portable device in the vehicle-to-portable device communications in response to a detection of variation in plural measured characteristics of the reference signal transmitted to the portable device from the access point.

The triggering may comprise an access point which is currently serving the portable device transmitting a control signal to the portable device for triggering the participation by the portable device in the vehicle-to-portable device communications. In such examples, the computer program code, when executed by the at least one processor, may cause the apparatus, prior to the triggering, to receive from the portable device at the access point which is currently serving the portable device, information indicative of successive measurements of the at least one characteristic of the reference signal. The computer program code, when executed by the at least one processor, may further cause the apparatus, in response to determining that a location of the portable device satisfies a predetermined condition, to cause the portable device to commence provision to the access point which is currently serving the portable device of the information indicative of successive measurements of the at least one characteristic of the reference signal.

Alternatively, the triggering of the participation by the portable device in the vehicle-to-portable device communications may be performed by the portable device.

The computer program code, when executed by the at least one processor, may cause the apparatus to determine a, or the, location of the portable device based at least in part on the at least one measured characteristic of at least two reference signals received from different access points.

The reference signal may usable by the portable device for channel estimation. Also or alternatively, the at least one measured characteristic of the reference signal may comprise at least one of reference signal received power and reference signal received quality.

The variation in the at least one measured characteristic of the reference signal may be indicative of movement of the portable device. Alternatively or additionally, the variation in the at least one measured characteristic of the reference signal may be a variation which satisfies at least one predetermined requirement.

In a fifth aspect, this specification describes a computer-readable medium having computer-readable code stored thereon, the computer-readable code, when executed by at least one processor, causing performance of at least responding to a detection of a variation in at least one measured characteristic of a reference signal transmitted from an access point to a portable device by triggering participation by the portable device in vehicle-to-portable device communications. The computer-readable code stored on the medium of the fifth aspect may further cause performance of any of the operations described with reference to the method of the first aspect.

In a sixth aspect, this specification describes apparatus comprising means for responding to a detection of a variation in at least one measured characteristic of a reference signal transmitted from an access point to a portable device by triggering participation by the portable device in vehicle-to-portable device communications. The apparatus of the sixth aspect may further comprise means for causing performance of any of the operations described with reference to the method of the first aspect.

BRIEF DESCRIPTION OF THE FIGURES

For better understanding of the present application, reference will now be made by way of example to the accompanying drawings in which.

DETAILED DESCRIPTION

In the description and drawings, like reference numerals refer to like elements throughout.

Figure 1:
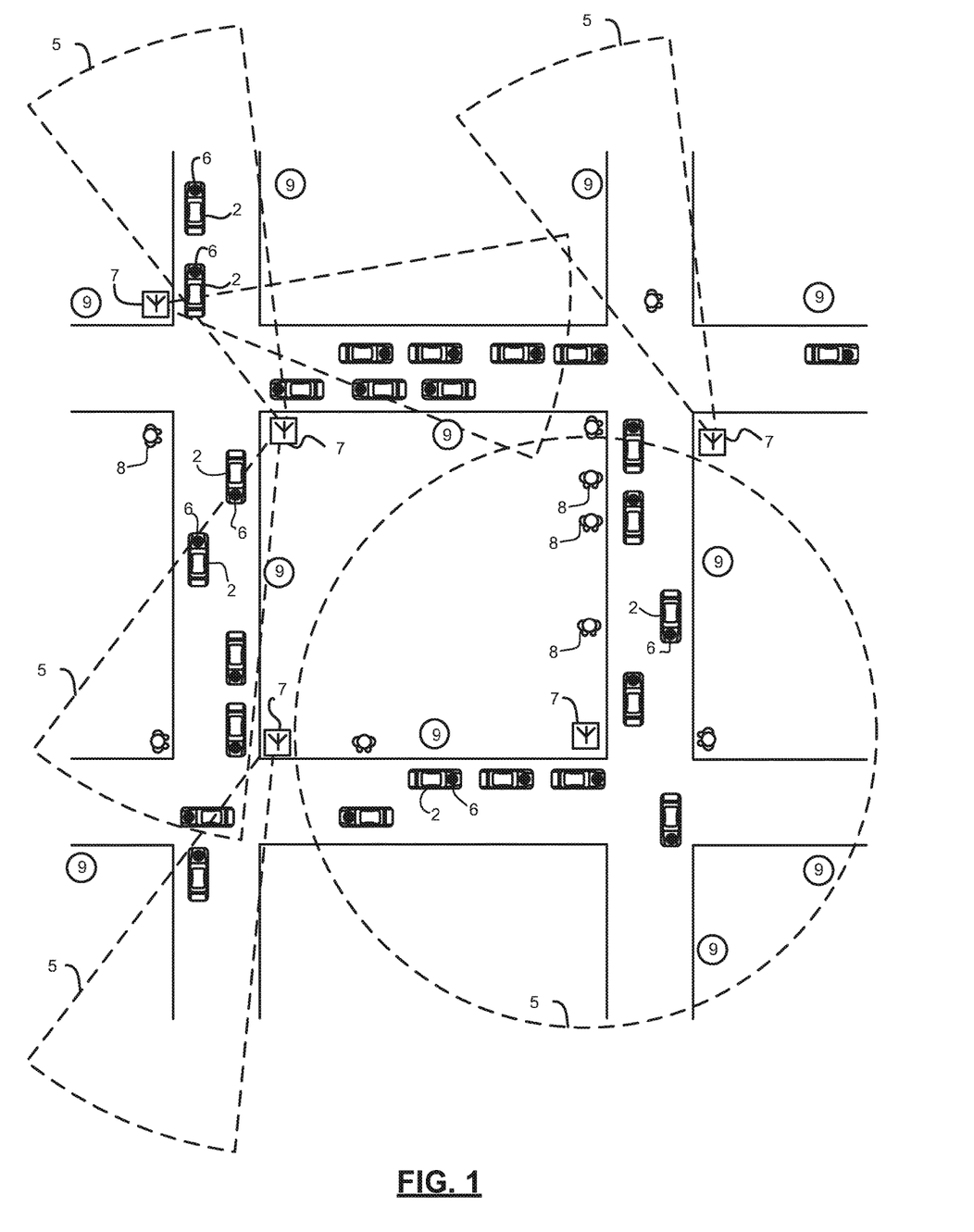
FIG. 1 is an example of a mobile telecommunications radio access network including one or more eNodeBs (eNBs), one or more vehicle user equipments (V-UEs) and one or more portable UEs (P-UEs)

Various methods and apparatuses are described in detail below, by way of example only, in the context of a mobile telecommunications radio access network 1, such as that illustrated in FIG. 1. The network 1 comprises one or more base stations or access points (eNodeBs, eNBs) 7. Only a small number of eNBs 7 are shown in FIG. 1, but a radio access network may typically comprise thousands of eNBs 7. Together, the eNBs 7 may provide radio coverage 5 to one or more user equipment (UE) 6, 8 over a wide geographical area. As illustrated in the example of FIG. 1, the network 1 may also include a plurality of other network nodes 9. The other network nodes 9 may be in the form of roadside units (RSUs) which may be positioned on the various infrastructural units (e.g. road signs, traffic lights, street lamps) which are provided at relatively short intervals (e.g. 30 metres) along routes of transportation systems.

The mobile telecommunications radio access network 1 may be, but is not limited to, an Evolved Universal Terrestrial Radio Access (E-UTRA) network or a 5G network. The eNBs 7, UEs 6, 8 and the other network nodes 9 within the network 1 may be configured to communicate with one another using an OFDM-based access scheme, such as orthogonal frequency division multiple access (OFDMA) and/or single carrier frequency division multiple access (SC-FDMA). For instance, in some non-limiting examples, OFDMA may be used for downlink communications whereas SC-FDMA may be used for uplink communications.

In the example of FIG. 1, the eNBs 7 are shown as providing coverage to a portion of a transportation system, in this case in the form of a network of roads. In such examples, some of the UEs 6 may form part of, or be otherwise co-located with, vehicles 2, such as cars. As such, the network 1 and entities therein may be said to be configured for V2X communication. UEs which are integrated in, or are otherwise co-located with, vehicles may be referred to as "vehicle UEs" (V-UEs) 6.

Also illustrated in FIG. 1 are UEs 8 which are carried by vulnerable road users. These road users are shown in FIG. 1 as pedestrians, however it will of course be understood that they may additionally include cyclists, motorcyclists, Segway users etc. Devices carried by such users will hereafter be referred to as portable UEs (P-UEs) 8. Such P-UEs 8 may be, for instance, portable multi-functional communications devices, such as smartphones etc. or may be more simple wireless communications devices such as location tags or transponders.

In FIG. 1, only a portion of the vehicles 2 and V-UEs 6 are indicated using reference numerals. However, it will of course be appreciated that any number of the vehicles travelling in a transportation system may include a V-UE 6. Similarly, only some of the vulnerable road users are indicated as having P-UEs 8. However, it will be appreciated than any number of the vulnerable road users may be carrying a P-UE 8. As will also be appreciated, FIG. 1 (and also FIG. 2) is intended for illustrative purposes only and is not to scale.

Figure 2:
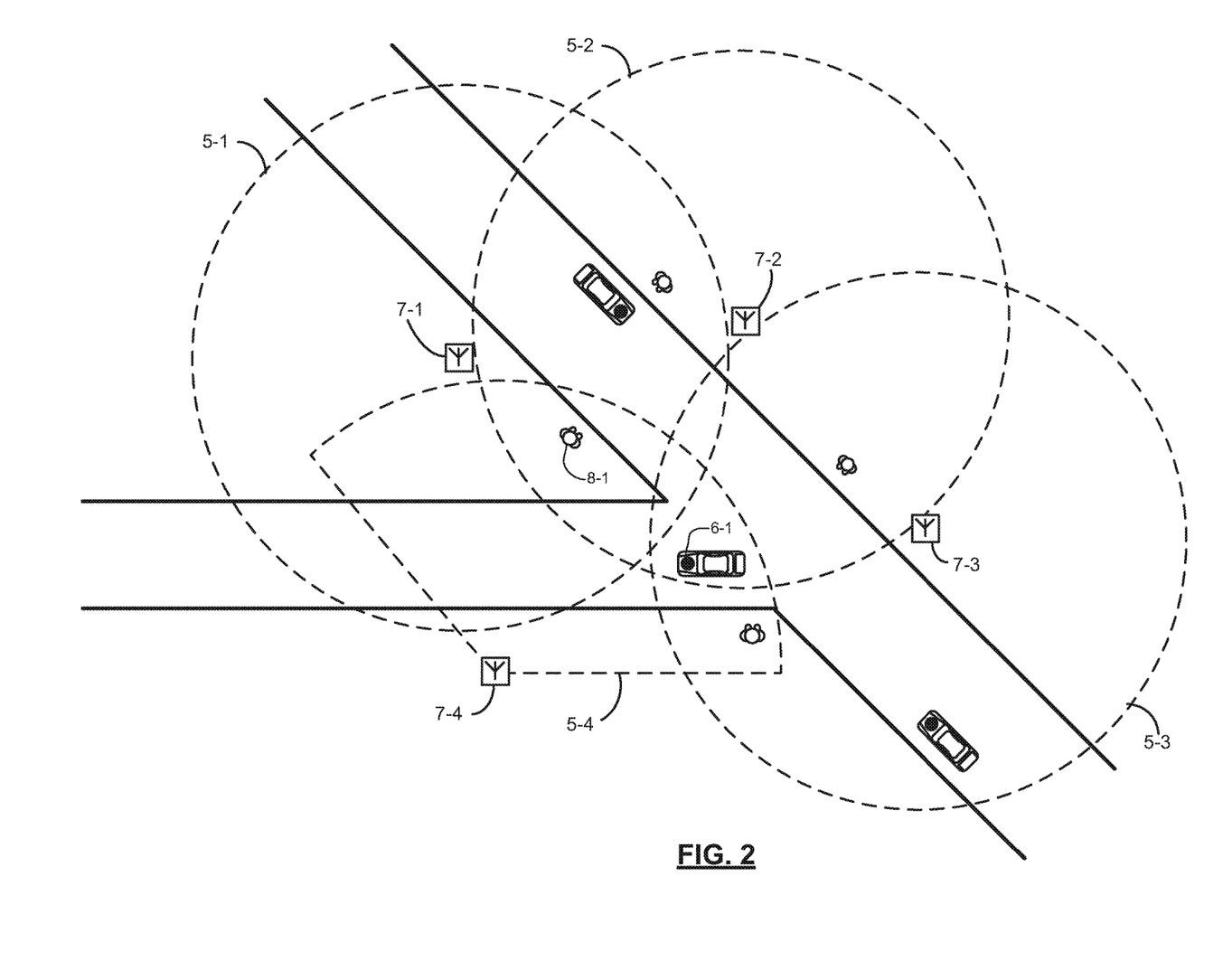
FIG. 2 is a part of a network, such as that of FIG. 1, including one or more eNodeBs (eNBs), one or more vehicle user equipments (V-UEs) and one or more portable UEs (P-UEs)

As illustrated in FIG. 2, which is a schematic illustration of a portion of a radio access network such as that of FIG. 1, the UEs 6, 8 may be within the coverage area of more than one eNB 7. For instance, in FIG. 2, a first V-UE 6-1 is in the coverage area 5-2, 5-3, 5-4 of three different eNBs 7-2, 7-3, 7-4. Similarly, a first P-UE 8-1 is also within coverage areas 5-1, 5-2, 5-4 of three different eNBs 7-1, 7-2, 7-4.

In order to improve safety of the users carrying the P-UEs 8, it may be beneficial for the P-UEs 8 to participate in communications with the V-UEs 6. Such communications may be referred to as vehicle-to-portable UE/device communications (V2P) or portable UE/device-to-vehicle communications (P2V). The V2P/P2V communications, which may also be referred to as a V2P/P2V services, may include the portable UE broadcasting, multicasting or otherwise transmitting data packets to one or more V-UEs 6 in the vicinity or vice versa (i.e. V-UEs 6 transmitting to P-UEs in the vicinity). The V2P/P2V communications may be bi-directional between the one or more V-UEs 6 and the P-UE 8. For the sake of simplicity, the V2P/P2V communications/service will hereafter be referred to, simply as vehicle-to-portable device (V2P) communications/service.

Because P-UEs may be carried by pedestrians, V2P communication may, in some examples, be used to refer to "vehicle-to-pedestrian" communication. However, even in such examples, V2P communication may not be limited to communications involving portable UEs carried by pedestrians but may encompass communications involving portable UEs carried by vulnerable road users of various different types.

At least some of the P-UEs 8 are, thus, configured to participate in V2P communications. Those P-UEs 8 may therefore have knowledge of (e.g. stored in memory) the configuration information required for the P-UE 8 to participate in such communications. Such configuration information may, for instance, identify the radio resources to be used when participating in V2P communications.

The V2P communications may enable V-UEs 6 and P-UEs 8 to detect one another and possibly also to locate one another, thereby to reduce the possibility of accidents. As such, it may be beneficial for V-UEs 6 and P-UEs to participate in V2P communications for as much of the time as possible. However, as will be appreciated, participation in such communications may result in the P-UEs 8 using more power than they otherwise would. This is potentially undesirable given that, in view of their portable nature, the P-UEs are likely to be battery-powered. Power consumption by V-UEs 6 is less important as these may draw power from the vehicle's battery which may be charged as required by the vehicle's motor.

In view of this, the eNBs 7 and/or P-UEs 8 may be configured to trigger participation by a, or the, P-UE 8 in communications with one or more vehicle-UEs in the vicinity in response to a detection of a variation in at least one measured characteristic of a reference signal transmitted from an, or the, eNB 7 to the P-UE 8. The variation in the measured characteristic of the reference signal may be indicative of the P-UE having started moving. P-UEs 8 are more likely to be a safety concern for vehicles when they are moving and, as such, it may be a good compromise between power usage considerations and safety benefits for the P-UE 8 to participate in V2P communications only when it is detected that the P-UE 8 is moving.

The reference signals may be similar to the reference signals in, for instance, LTE based upon which channel estimation is performed. UEs within LTE (or similar) networks are required to perform channel estimation frequently and, as such, are already required to frequently perform measurements of characteristics of such reference signal. Consequently, monitoring the outcome of these measurements for purposes of triggering participation in V2P communications may place very little additional burden on the P-UE 8 or eNB 7. In some examples, the characteristics of the reference signal which are taken into account may include at least one of reference signal received power (RSRP) and reference signal received quality (RSRQ).

Triggering participation by the P-UE 8 in the V2P communications may include causing the P-UE 8 to transmit data packets for receipt by one or more V-UEs 6 in the vicinity and/or causing the P-UE 8 to enable receipt at the P-UE 8 of data packets transmitted by one or more V-UEs 6 in the vicinity. The triggering may be performed by an eNB 7 with which the P-UE 8 in already in communication, for instance via a control message sent from the eNB 7 to the P-UE 8. Alternatively, the triggering may be performed autonomously by the P-UE 8. Triggering performed by the P-UE 8 may be beneficial in scenarios in which the P-UE is at least temporarily out of network coverage (i.e. unable to receive on its serving carrier but potentially capable of measuring reference signals from other cells/eNBs 7) and so is unable to receive the trigger for activating participation in V2P communications from its serving eNB 7.

In some examples, the P-UEs 8 may be configured to monitor one or more characteristics of reference signals received from more than one eNB 7. In such examples, the participation in V2P communications may be triggered only in response to detecting a variation in one or more characteristics of reference signals received from more than one eNB 7. In this way, the P-UE 8 can be more certain that the variations are due to movement and not some transitory interference (e.g. an obstruction between eNB 7 and P-UE 8) that is affecting the reference signals from only one eNB 7.

Similarly, in some examples, the triggering of the participation in the V2P communications may occur only in response to a detection of a variation in plural measured characteristics of the one or more reference signals. For instance, a variation in both the reference signal received power (RSRP) and the reference signal received quality (RSRQ) may be required for the triggering to occur.

The variation in the one or more measured characteristics of the one or more reference signals may be required to be indicative of movement of the P-UE 8 in order for the triggering of participation in V2P communications to be performed. As such, the variation which triggers the participation in V2P communications may be required to satisfy at least one predetermined requirement. For instance, a measure of the variation may be required to be sufficiently large, for instance above a threshold. The measure may be for instance, relative variation (such as a percentage) of an original value or the modulus/absolute value of the variation. In some examples, the at least one requirement may additionally or alternatively relate to the rate of variation or the duration over which the variation occurred. For instance the rate of variation (e.g. relative variation or variation in absolute terms) may be required to be within an allowed range. This allowed range may be a range that is indicative of movement. As such, sudden significant variations which result from, for instance, transitory anomalies may not trigger the participation in V2P communications. Thus, in one specific, non-limiting example, in order to trigger the participation in V2P communications, a variation having an absolute value above a threshold and rate of variation within an allowed range must be detected.

The predefined requirements with respect to the variation of the reference signal characteristics may be defined by the eNB 7 (or a server in communication with the eNB 7). In examples, in which the triggering is performed by the P-UE, the eNB 7 (or another access point) may provide the predefined requirements to the P-UE 8 which then stores them for future use. The requirements may be defined individually for each P-UE 8. For instance, they may be defined based on P-UE mobility state information (if this has previously been received from the P-UE) or the mobility-HistoryReport Information Element defined in 3GPP TS 36.331 (E-UTRA Radio Resource Control (RRC) Protocol Specification).

The P-UEs 8 or the eNBs 7 may be configured also to determine the location of the P-UE 8. This may be performed in any suitable way, for instance based on positioning determinations (e.g. using GNSS) made by the P-UE 8 (and transmitted to the eNB 7, where appropriate). In some examples, the approximate location of the P-UE 8 may be estimated based at least in part on the at least one measured characteristic of at least two different reference signals received from different cells/eNBs 7. Alternatively, the P-UE's location may be determined based on LTE Positioning Protocol (LPP) as defined in 3GPP TR 36.355 (LTE Positioning Protocol (LPP)). LPP is based on an observed time difference of arrival (OTDOA) mechanism, uses cellular network infrastructure and a location server and, although perhaps not as accurate as GNSS, may be able to determine the location of the P-UE 8 with sufficient accuracy. The actual choice of positioning method may depend on various factors such as, but not limited to, required accuracy, availability, current radio resource control (RRC) state, etc.

In examples in which the eNB 7 is configured to trigger the P-UE's participation in V2P communications, the P-UE 8 may be configured to send information identifying its location (e.g. geographical coordinates) to the eNB 7. This information may, for instance, be sent using the Location-Info Information Element as described in 3GPP TS 36.331 (E-UTRA Radio Resource Control (RRC) Protocol Specification).

Regardless of the way in which the location of the P-UE is determined, the P-UE 8 or eNB 7 may be configured to determine whether a location of the P-UE 8 satisfies a predetermined condition. In some examples, the triggering of the participation in the V2P communications may be performed only if it has been determined that the location of the P-UE 8 does satisfy the predetermined condition. In such examples, if it has not been determined that the location of the P-UE satisfies the predetermined condition, the P-UE's participation in V2P communications may not be triggered regardless of the variation in the measured reference signal characteristic.

The predetermined condition which must be satisfied for triggering of the participation in V2P communications may comprise, for instance, a requirement of a predetermined relationship between the location of the P-UE and a location of a component of a vehicular transportation network, such as a road or railway network. The predetermined relationship may be that the P-UE 8 is within a threshold distance of the component (e.g. a road or length of track) of the transportation network. In this way, the V2P/V2P services may not be triggered unless the P-UE 8 is both moving and is close enough to, for instance, a road to be a safety concern. The P-UE 8 or eNB 7 may be configured to determine if the P-UE's location satisfies the predetermined condition based on map data, which may be stored locally at the determining entity or may be accessed via a network.

In some examples, the determination as to whether the location of the P-UE 8 satisfies the predetermined condition may be performed only in response to (or put, another way, may be triggered by) detection of the variation in the at least one characteristic of the at least one reference signals. Thus, the comparison of location of the P-UE with the predetermined condition may be performed only following the detection of the variation in reference signal characteristic. In this way, the P-UE 8 or eNB 7 is not required to monitor the P-UEs location (or at least to compare the P-UE's location to the condition) until the variation in reference signal characteristic is detected. As, the characteristics of the reference signals may be monitored anyway, e.g. for the purpose of channel estimation, this may reduce the burden on the P-UE 8 and/or eNB 7.

In other examples, the P-UE 8 or eNB 7 first determines that the location of the P-UE satisfies the predetermined condition and, only after such a determination is made, does the P-UE or eNB 7 become responsive to the variations in reference signal characteristics to trigger the participation in V2P communications. Furthermore, in some examples, the monitoring of the variation in the reference signal characteristic may be performed only in response to a determination that the location of the P-UE 8 satisfies the predetermined condition.

In examples in which the location determination is made prior to the eNB being responsive to the variations in reference signal characteristics (in which the eNB is responsible for the triggering), the eNB 7 may respond to the determination that the location satisfies the predetermined duration by causing the P-UE 8 to switch into a "reporting mode" in which measurements of the reference signal characteristics are regularly or periodically reported to the eNB 7. When operating in the reporting mode, the P-UE 8 may be configured to report measurements of the characteristics of reference signals received from its serving eNB 7 and also to report measurements of characteristics of reference signals received from one or more other (neighbouring) eNBs 7. This reporting mode may be, or may be similar to, the radio resource control connected mode (RRC_CONNECTED) in LTE.

Prior to being switched to the reporting mode, the P-UE 8 may operate in an "idle mode", in which the measurements are not reported to the eNB 7. The idle mode may be, or may be similar to, the radio resource control idle mode (RRC_IDLE) in LTE. It is noted, however, that even when the P-UE 8 is in the idle mode, it may still perform measurements of the characteristic(s) of the reference signal(s).

In some examples, the P-UE 8 may be configured to monitor its own location for compliance with the predetermined condition and, when it is determined that its location is compliant, the P-UE 8 may set itself into the reporting mode, thereby to enable the eNB 7 to monitor the reference signals characteristics (and to respond to variations accordingly).

Figure 3:
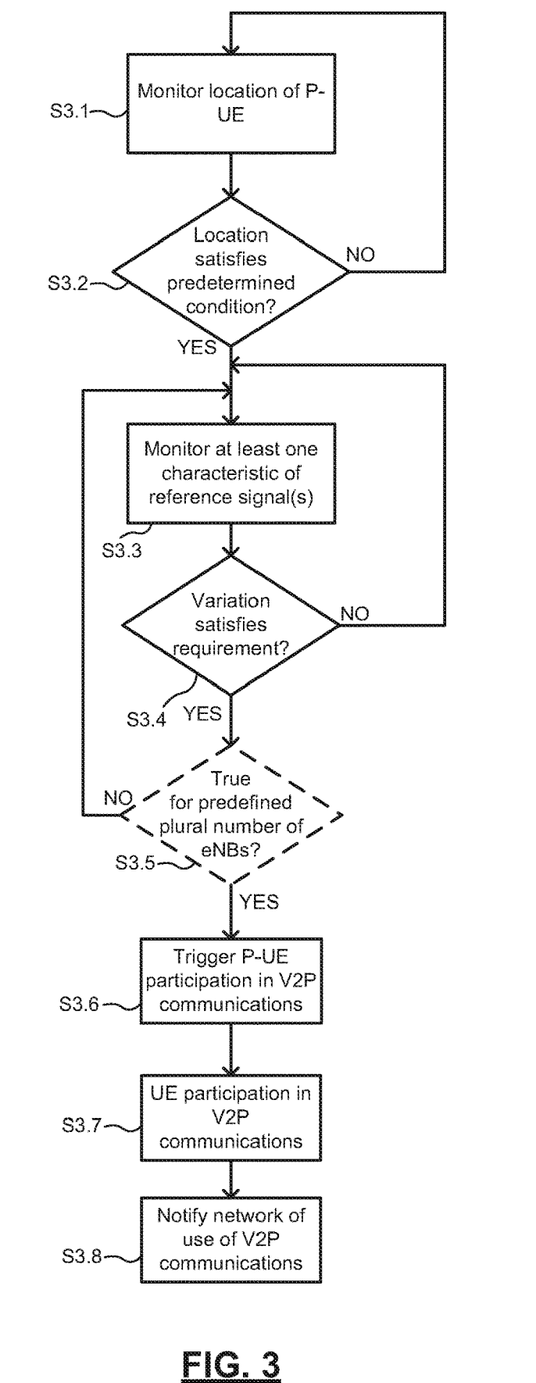
FIG. 3 is a flow chart illustrating various operations which may be performed by P-UEs operating within the network of FIGS. 1 and 2.

FIG. 3 is a flow chart illustrating various operations which may be performed by P-UEs 8, under the control of their control apparatus 80, operating within a radio access network such as depicted in FIGS. 1 and 2. As will of course be appreciated, various operations illustrated in FIG. 3 correspond to operations already described with reference to FIGS. 1 and 2.

In operation S3.1, the P-UE 8 monitors its location. This may include determining its location using GNSS or in another suitable way, for instance based on communications with various access points in the vicinity (e.g. using radio fingerprinting). Alternatively, the operation may include the P-UE 8 receiving information indicative of its location from a location server or the like, for instance when LPP is employed.

In operation S3.2, the P-UE 8 compares its location with the predetermined condition and thereby determines if its location satisfies the predetermined condition. As mentioned above, the predetermined condition may relate to proximity to a road or the like. As such, in order to determine if the predetermined condition is satisfied, the P-UE 8 may be configured to access mapping information indicative of locations of components (roads, tracks etc.) of a transportation network. The mapping information may be stored locally or may be accessed via a network.

If it is determined that the predetermined condition is not satisfied by the P-UE's location, the P-UE 8 may continue to monitor its location in operation S3.1. If, however, it is determined, that the predetermined condition is satisfied, the P-UE 8 may proceed to operation S3.3.

In operation S3.3, the P-UE may monitor for variations in one or more measured characteristics of a reference signal received from at least one eNB 7. The measured characteristics may include RSRP and RSRQ measurements of the reference signal. In some examples, variations in measured characteristics may be monitored for reference signals received from plural different eNBs 7, while in other examples they may be monitored for only a single eNB (for instance, the eNB 7 currently serving the P-UE 8).

In operation S3.4, the P-UE 8 determines if a variation in the at least one measured characteristic which satisfies one or more pre-defined requirements has been detected. The pre-defined requirement(s) may be as described above with reference to FIGS. 1 and 2, for instance a percentage or absolute variation in excess of a threshold.

If such a variation is not detected, the P-UE 8 may return to monitoring the measured characteristics (at least until the location of the P-UE 8 no longer satisfies the pre-determined condition).

If a variation in the at least one measured characteristic which satisfies one or more pre-defined requirements is detected, the P-UE 8 may proceed to operation S3.5. Alternatively, if variation is only required to be detected in respect of a reference signal from a single eNB 7 in order to trigger participation in V2P communications, the P-UE 8 may proceed directly to operation S3.6.

In S3.5, the P-UE 8 determines if the required variation has been detected in respect of reference signals from a predefined plural number of different eNBs 7 (e.g. two or three). In response to a negative determination, the P-UE 8 may return to operation S3.3. In response to a position determination (i.e. that the required variation has been detected in respect of reference signals from a predefined plural number of different eNBs 7), the P-UE 8 proceeds to operation S3.6.

In operation S3.6, the P-UE 8 triggers its participation in V2P communications. This may be performed entirely autonomously (without having received an instruction from the network infrastructure or a user). Alternatively, it may be performed without having received an instruction from the network infrastructure but following an instruction from the user. For instance, in response to a positive determination in either of operations S3.4 and S3.5 (or, if operations S.3.1 and S3.2 are performed subsequent to a positive determination in either of operations S3.4 and S3.5, in response to a positive determination in operation S3.2), the P-UE 8 may inform the user about entering the V2P communications or, e.g. if legally required, prompt the user for an instruction to participate in V2P communications.

After triggering the participation in V2P communications, the P-UE 8 (in operation S3.7) proceeds to participate in V2P communications. For instance, the P-UE 8 may begin transmitting data packets for receipt by V-UEs 6 in the vicinity and/or may enable receipt of data packets transmitted by the V-UEs 6 in the vicinity.

Also subsequent to triggering participation in V2P communications, the P-UE 8 (in operation S3.8) may notify the network (e.g. via its serving eNB 7) that it is participating in V2P communications (or put another way, is making use of V2P services). This notification may be forwarded to, for instance, a V2X server, which may ensure that the P-UE 8 receives available V2P services.

Figure 4:
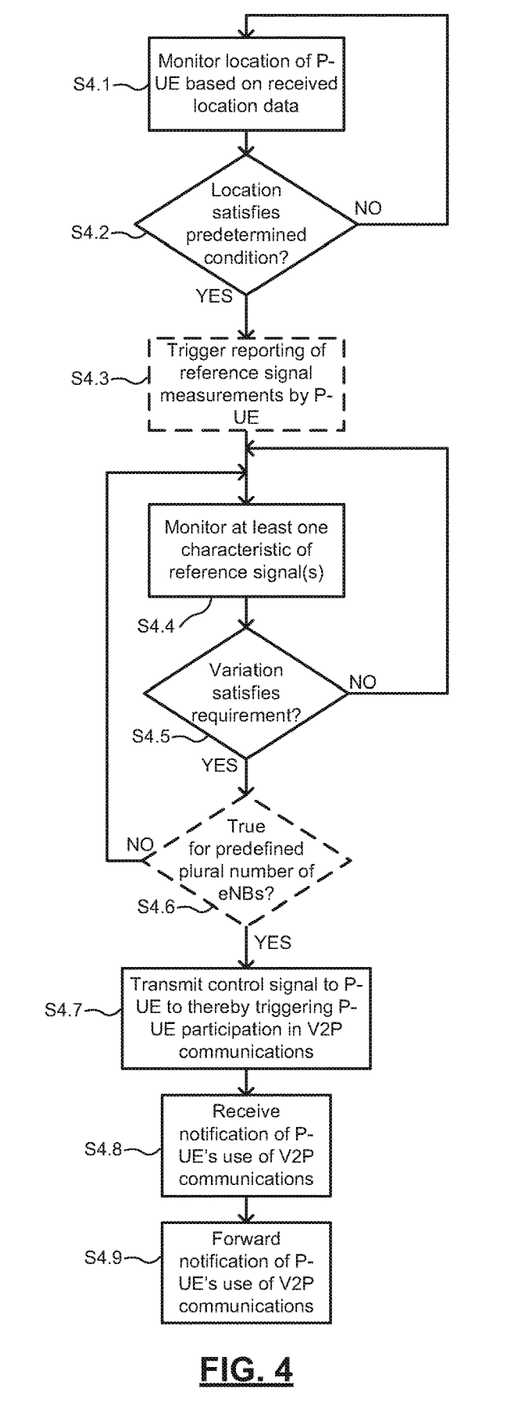
FIG. 4 is a flow chart illustrating various operations which may be performed by eNBs operating within the network of FIGS. 1 and 2.

FIG. 4 is a flow chart illustrating various operations which may be performed by eNBs 7, under the control of their control apparatus 70, operating within a radio access network such as that of FIGS. 1 and 2. As will of course be appreciated, various operations illustrated in FIG. 4 correspond to operations already described with reference to FIGS. 1 and 2.

In operation S4.1, the eNB 7 may monitor the location of a P-UE 8 that it is currently serving. This may include receiving signals including location data (e.g. derived using GNSS or LPP) from the P-UE 8, for instance at regular intervals. Alternatively, it may include receiving location information for the P-UE 8 from a location server associated with the network 1, which tracks/determines locations of multiple UEs 6, 8 within the network 1.

In operation S4.2, the eNB 7 compares the location of the P-UE 8 with the predetermined condition thereby to determine if the location satisfies the predetermined condition. The predetermined condition may be as described with reference to FIGS. 1 to 3.

If it is determined that the predetermined condition is not satisfied by the P-UE's location, the eNB 7 may continue to monitor the location of the P-UE 8 in operation S4.1. If, however, it is determined, that the predetermined condition is satisfied, the eNB 7 may proceed to operation S4.3.

In operation S4.3, the eNB 7 may respond to the positive determination of operation S4.2 by triggering the reporting by the P-UE 8 to the eNB 7 of measurements of characteristics (e.g. RSRP and RSRQ) of one or more reference signals. For instance, the P-UE 8 may be caused to enter a reporting mode in which it periodically reports such measurements. If the P-UE 8 was already operating in this mode, the eNB 7 may skip operation S4.3. When in reporting mode, the P-UE 8 may report to a single eNB 7 (e.g. that by which it is currently being served) measured characteristics of reference signals received from plural different eNBs 7.

In operation S4.4, the eNB 7 monitors for variations in the received measurements of reference signal characteristics. In operation S4.5, the eNB 7 determines if a variation in at least one of the measured characteristics which satisfies one or more pre-defined requirements has been detected. The pre-defined requirement with regard to the variation may be as described above with reference to FIGS. 1, 2 and 3.

If such a variation is not detected, the eNB 7 may return to monitoring the measured characteristics in operation S4.4 (at least until the location of the P-UE 8 no longer satisfies the pre-determined condition).

If a variation in the at least one measured characteristic which satisfies one or more pre-defined requirements is detected, the eNB 7 may proceed to operation S4.6 (or, in some examples, directly to operation S4.7).

In S4.6, the eNB 7 determines whether the required variation has been detected in respect of reference signals from a predefined plural number of different eNBs 7 (e.g. two or three). In response to a negative determination, the eNB 7 may return to operation S 4.4. In response to a positive determination (i.e. a determination that the required variation has been detected in respect of reference signals from a predefined plural number of different eNBs 7), the eNB 7 proceeds to operation S4.7.

In operation S4.7, the eNB 7 triggers participation by the P-UE 8 in V2P communications. This may be performed by transmitting a control signal to the P-UE 8, the control signal being for causing the P-UE 8 to begin participation in V2P communications. In some examples, the P-UE 8 may respond to receipt of the control signal by activating V2P communications directly. Alternatively, the P-UE 8 may respond by informing a user or, if e.g. legally required, prompting for an instruction from a user of the P-UE 8, with participation in V2P communications being activated only in response to such an instruction.

Subsequent to the P-UE 8 activating participation in V2P communications, the P-UE 8 may notify the network that it is participating in V2P communications. This notification may be received at the eNB 7 in operation S4.8. In operation S4.9, the eNB 7 may forward the notification to, for instance, a V2X server, which may ensure that the P-UE 8 receives such services.

As will be appreciated, the flow charts of FIGS. 3 and 4 are examples only. As such, various operations may be omitted, re-ordered or combined. Similarly, other operations may be included. For instance, as described with reference to FIGS. 1 and 2, in some examples, the consideration of the location of the P-UE 8 (of operations S3.1 and S4.1) and the comparison with the predetermined condition (of operations S3.2 and S4.2) may be performed only after the requisite variation in reference signal characteristics have been detected. As such, operations S3.1 (or S4.1) and S3.2 (or S4.2) may, in fact take place after operation S3.4 (or S4.5) (or operation S3.5 (or S4.6), if it is performed).

Similarly, in some examples, the P-UE 8 may monitor its location and compare it to the predetermined condition and in response to a determination that the predetermined condition is met may provide a signal indicative of this to the eNB 7. The eNB 7 may then respond to receipt of this signal by monitoring for variations in the characteristics of the reference signals.

As such, in the flow of FIG. 4 which is performed by the eNB 7, operations S4.1 and S4.2 may be replaced by a single operation of receiving a signal indicative of the P-UE's location satisfying the predetermined condition.

Also, although not illustrated in either of FIG. 3 or 4, the P-UE 8 or eNB 7 may be further configured to disable use by the P-UE 8 of V2P services/participation in V2P communications. This may be performed in response to detecting that the P-UE's location no longer satisfies the predetermined condition, and/or in response to determining that requisite variation(s) in the measured characteristic of the reference signal(s) is no longer occurring.

Figure 5:
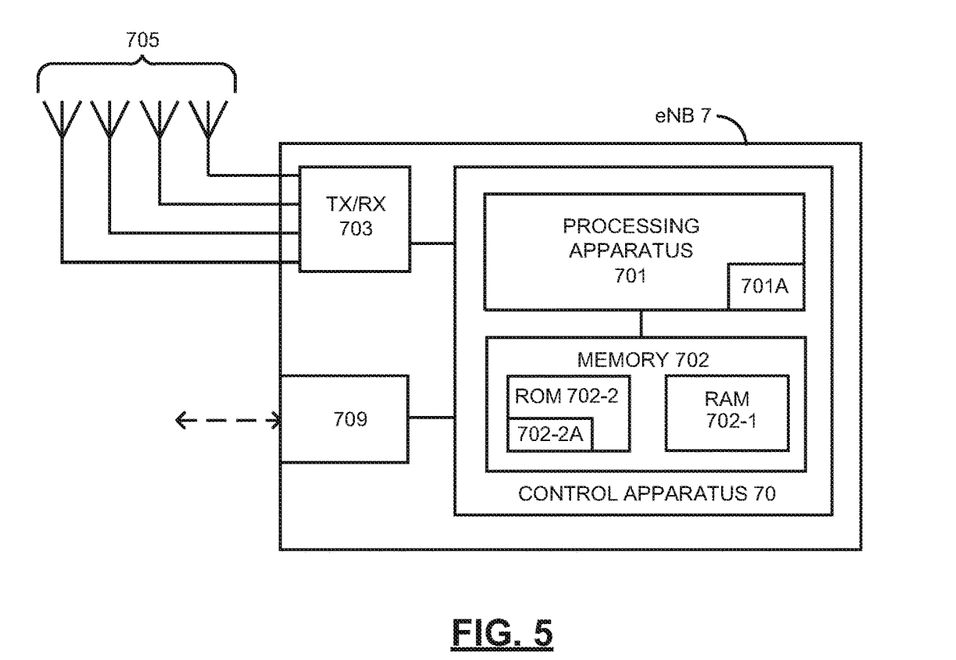
FIG. 5 is a schematic illustration of an example configuration of an eNB which may be configured to perform various operations described with reference to FIGS. 1, 2 and 4.

FIG. 5 is a schematic illustration of an example configuration of an eNB 7 which may be configured to perform various operations described with reference to FIGS. 1, 2 and 4.

The eNB 7, which may be referred to a base station or access point (AP), comprises control apparatus 70 which is configured to control operation of other components which form part of the UE 7 thereby to enable transmission of signals to and receipt of signals from UEs 6, 8 in its coverage area vicinity. For example, the eNB control apparatus 70 is configured at least to cause transmission of reference signals to P-UEs 8 within its coverage area. Furthermore, in some examples, the control apparatus 70 may be configured to enable receipt of reference signal measurement data and/or location data from the P-UEs 8 in its coverage area. It may also be configured to cause trigger or control signals to be transmitted to those P-UEs 8 for causing the P-UEs 8 to participate in V2P communications and, in some examples, to switch to a reporting mode. The control apparatus 70 may also enable communication with the eNBs 7 and/or other network nodes 9 and/or a V2X server. The control apparatus 70 may additionally be configured to cause performance of any other operations described herein with reference to the eNBs 7.

Figure 7:
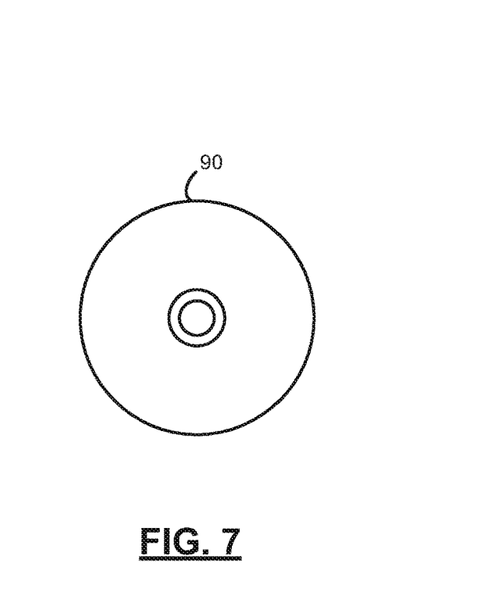
FIG. 7 is an illustration of a computer-readable medium upon which computer readable code may be stored.

The eNB 7 comprises a radio frequency antenna array 705 configured to receive and transmit radio frequency signals. Although the eNB 7 in FIG. 7 is shown as having an array 705 of four antennas, this is illustrative only. The number of antennas may vary, for instance, from one to many hundreds.

The eNB 7 further comprises a radio frequency interface 703 configured to interface the radio frequency signals received and transmitted by the antenna 701 and a control apparatus 70. The radio frequency interface 703 may also be known as a transceiver. The apparatus 70 may also comprise an interface 709 via which, for example, it can communicate (e.g. via X2 messages) with other network elements such as the other eNBs 7 and a server apparatus, such as a V2X server.

The eNB control apparatus 70 may be configured to process signals from the radio frequency interface 703, to control the radio frequency interface 703 to generate suitable RF signals to communicate information to the UEs 6 via the wireless communications link, and also to exchange information with other eNBs 7 and the server apparatus 3 via the interface 709.

The control apparatus 70 may comprise processing apparatus 701 and memory 702. Computer-readable code 702-2A may be stored on the memory 702, which when executed by the processing apparatus 701, causes the control apparatus 70 to perform any of the operations described herein and attributed to the eNBs 7.

Figure 6:
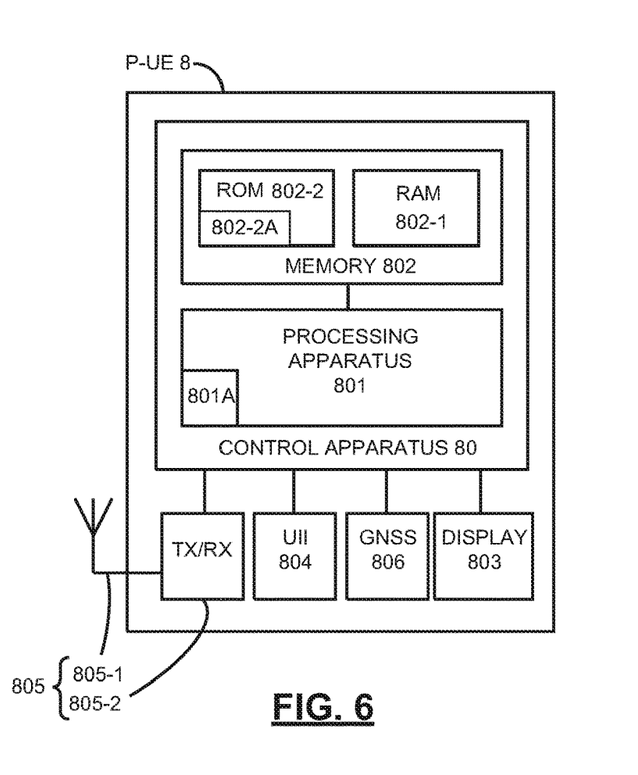
FIG. 6 is a schematic illustration of an example configuration of a P-UE which may be configured to perform various operations described with reference to FIGS. 1, 2 and 3.

FIG. 6 is a schematic illustration of an example configuration of a P-UE 8. The P-UE 8 may be any portable device capable of at least sending radio signals to (and in some examples receiving signals from the V-UEs 6 and eNBs and of performing the various operations described above with respect to P-UEs 8, for instance with reference to FIGS. 1, 2 and 3.

The P-UE 8 comprises control apparatus 80 for controlling the other components of the P-UE 8. In particular, the control apparatus 80 is configured to enable communication with one or more V-UEs 6, including participation in V2P communications, and one or more eNBs 7 in the vicinity, including receipt of reference signals. The control apparatus 80 may be configured to cause transmission of reference signal measurement data and/or location data to the eNBs 7. It may also be configured to enable receipt of trigger/control signals from the eNBs for causing the P-UE 8 to participate in V2P communications.

The P-UE 8 may communicate via an appropriate radio interface arrangement 805. The interface arrangement 805 may be provided for example by means of a radio part 805-2 (e.g. a transceiver) and an associated antenna arrangement 805-1. The antenna arrangement 805-1 may be arranged internally or externally to the P-UE 8.

The P-UE control apparatus 80 may comprise processing apparatus 801 and memory 802. Computer-readable code 802-2A may be stored on the memory, which when executed by the processing apparatus 801, causes the control apparatus 80 to perform any of the operations described herein in relation to the P-UE 8. Example configurations of the memory 802 and processing apparatus 801 will be discussed in more detail below.

The P-UE 8 may, in some instances, further comprise a positioning module 806 for determining its geographic location. This module 806 may determine the location of the P-UE 8 in any suitable way and may be for instance a global Navigation satellite system (GNSS) module.

The P-UE 8 may be, for example, a device that does not need human interaction, such as an entity that is involved in Machine Type Communications (MTC). Alternatively, the P-UE 8 may be a device designed for tasks involving human interaction such as making and receiving phone calls between users, and streaming multimedia or providing other digital content to a user.

The P-UE 8 may be any device that is provided with a wireless interface facility and is suitable to be carried by a person. For instance, the P-UE 8 may be any of a smart phone, a location tag, a tablet computer, an e-reader device, a laptop computer, and a notebook computer.

In implementations in which the P-UE 8 is a device designed for human interaction, the user may control the operation of the P-UE 8 by means of a suitable user input interface UII 804 such as key pad, voice commands, touch sensitive screen or pad, combinations thereof or the like. A display 803, a speaker and a microphone may also be provided. Furthermore, the P-UE 8 may comprise appropriate connectors (either wired or wireless) to other devices and/or for connecting external accessories, for example hands-free equipment, thereto.

Some further details of components and features of the above-described devices/entities/apparatuses 7, 8 and alternatives for them will now be described.

The control apparatuses described above 70, 80 may comprise processing apparatus 701, 801 communicatively coupled with memory 702, 802. The memory 702, 802 has computer readable instructions 702-2A, 802-2A stored thereon, which when executed by the processing apparatus 701, 801 causes the control apparatus 70, 80 to cause performance of various ones of the operations described with reference to FIGS. 1 to 6. The control apparatus 70, 80 may in some instance be referred to, in general terms, as "apparatus".

The processing apparatus 701, 801 may be of any suitable composition and may include one or more processors 701A, 801A of any suitable type or suitable combination of types. Indeed, the term "processing apparatus" should be understood to encompass computers having differing architectures such as single/multi-processor architectures and sequencers/parallel architectures. For example, the processing apparatus 701, 801 may be a programmable processor that interprets computer program instructions 702-2A, 802-2A and processes data. The processing apparatus 701, 801 may include plural programmable processors. Alternatively, the processing apparatus 701, 801 may be, for example, programmable hardware with embedded firmware. The processing apparatus 701, 801 may alternatively or additionally include one or more specialised circuit such as field programmable gate arrays FPGA, Application Specific Integrated Circuits (ASICs), signal processing devices etc. In some instances, processing apparatus 701, 801 may be referred to as computing apparatus or processing means.

The processing apparatus 701, 801 is coupled to the memory 702, 802 and is operable to read/write data to/from the memory 702, 802. The memory 702, 802 may comprise a single memory unit or a plurality of memory units, upon which the computer readable instructions (or code) 702-2A, 802-2A is stored. For example, the memory 702, 802 may comprise both volatile memory 702-1, 802-1 and non-volatile memory 702-2, 802-2. In such examples, the computer readable instructions/program code 702-2A, 802-2A may be stored in the non-volatile memory 702-2, 802-2 and may be executed by the processing apparatus 701, 801 using the volatile memory 702-1, 802-1 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The memory 702, 802 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

The computer readable instructions/program code 702-2A, 802-2A may be pre-programmed into the control apparatus 70, 80. Alternatively, the computer readable instructions 702-2A, 802-2A may arrive at the control apparatus via an electromagnetic carrier signal or may be copied from a physical entity 90 such as a computer program product, a memory device or a record medium such as a CD-ROM or DVD an example of which is illustrated in FIG. 7. The computer readable instructions 702-2A, 802-2A may provide the logic and routines that enables the entities devices/apparatuses 6, 8 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although the method and apparatus have been described in connection with an E-UTRA network, it will be appreciated that they are not limited to such networks and are applicable to radio networks of various different types.

Although various aspects of the methods, apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. Apparatus comprising:
    at least one processor; and
    at least one memory including computer program code which, when executed by the at least one processor, causes the apparatus:
    to respond to a detection of a variation in measured characteristics of a reference signal transmitted from an access point to a portable device, the measured characteristics comprising both reference signal received power and reference signal received quality, the variation being indicative of movement of the portable device, by triggering participation by the portable device in vehicle-to-portable device communications, wherein the portable device participates in the vehicle-to-portable device communications only when the portable device is moving.

2. The apparatus of claim 1, wherein the computer program code, when executed by the at least one processor, causes the apparatus:
    to determine whether a location of the portable device satisfies a predetermined condition; and
    to trigger the participation by the portable device in the vehicle-to-portable device communications in response to the detection of the variation in the measured characteristics of the reference signal only if it has been determined that the location of the portable device satisfies the predetermined condition.

3. The apparatus of claim 2, wherein the predetermined condition comprises a requirement of a predetermined relationship between the location of the portable device and a location of a component of a vehicular transportation network.

4. The apparatus of claim 2, wherein the computer program code, when executed by the at least one processor, causes the apparatus:
    in response to the determination that the location of the portable device satisfies the predetermined condition, to become responsive to detection of the variation in the measured characteristics of the reference signal to trigger the participation by the portable device in the vehicle-to-portable device communications.

5. The apparatus of claim 2, wherein the computer program code, when executed by the at least one processor, causes the apparatus:
    to respond to the detection of the variation in the measured characteristics by performing the determination as to whether the location of the portable device satisfies the predetermined condition.

6. The apparatus of claim 1, wherein the computer program code, when executed by the at least one processor, causes the apparatus:
    to trigger the participation by the portable device in the vehicle-to-portable device communications in response to a detection of a variation in the measured characteristics of a predefined plural number of reference signals each transmitted to the user equipment from a different access point.

7. The apparatus of claim 1, wherein the triggering comprises an access point which is currently serving the portable device transmitting a control signal to the portable device for triggering the participation by the portable device in the vehicle-to-portable device communications.

8. The apparatus of claim 7, wherein the computer program code, when executed by the at least one processor, causes the apparatus:
    prior to the triggering, to receive from the portable device at the access point which is currently serving the portable device, information indicative of successive measurements of the measured characteristics of the reference signal.

9. The apparatus of claim 8, wherein the computer program code, when executed by the at least one processor, causes the apparatus:
    in response to determining that a location of the portable device satisfies a predetermined condition, to cause the portable device to commence provision to the access point which is currently serving the portable device of the information indicative of successive measurements of the measured characteristics of the reference signal.

10. The apparatus of claim 1, wherein the triggering of the participation by the portable device in the vehicle-to-portable device communications is performed by the portable device.

11. The apparatus of claim 1, wherein the computer program code, when executed by the at least one processor, causes the apparatus:
to determine a, or the, location of the portable device based at least in part on the measured characteristics of at least two reference signals received from different access points.

12. The apparatus of claim 1, wherein the variation in the measured characteristics of the reference signal is a variation which satisfies at least one predetermined requirement.

13. A method comprising:
responding to a detection of a variation in measured characteristics of a reference signal transmitted from an access point to a portable device, the measured characteristics comprising both reference signal received power and reference signal received quality, the variation being indicative of movement of the portable device, by triggering participation by the portable device in vehicle-to-portable device communications, wherein the portable device participates in the vehicle-to-portable device communications only when the portable device is moving.

14. The method of claim 13, comprising:
determining whether a location of the portable device satisfies a predetermined condition; and
triggering the participation by the portable device in the vehicle-to-portable device communications in response to the detection of the variation in the measured characteristics of the reference signal only if it has been determined that the location of the portable device satisfies the predetermined condition.

15. The method of claim 14, wherein the predetermined condition comprises a requirement of a predetermined relationship between the location of the portable device and a location of a component of a vehicular transportation network.

16. The method of claim 14, comprising:
in response to the determination that the location of the portable device satisfies the predetermined condition, becoming responsive to detection of the variation in the measured characteristics of the reference signal to trigger the participation by the portable device in the vehicle-to-portable device communications.

17. The method of claim 14, comprising:
responding to the detection of the variation in the measured characteristics by performing the determination as to whether the location of the portable device satisfies the predetermined condition.

18. A computer program product comprising a non-transitory computer-readable medium having computer-readable code stored thereon, the computer-readable code, when executed by at least one processor, causing performance of at least:
responding to a detection of a variation in measured characteristics of a reference signal transmitted from an access point to a portable device, the measured characteristics comprising both reference signal received power and reference signal received quality, the variation being indicative of movement of the portable device, by triggering participation by the portable device in vehicle-to-portable device communications, wherein the portable device participates in the vehicle-to-portable device communications only when the portable device is moving.

19. The apparatus of claim 1, wherein the reference signal is usable by the portable device for channel estimation.

* * * * *